United States Patent
Klingensmith (10) Patent No.: US 6,260,796 B1
(45) Date of Patent: Jul. 17, 2001

(54) MULTI-THRUSTERED HOVER CRAFT

(75) Inventor: Wallace Neil Klingensmith, S.75 W.16890 Gregory Dr., Muskego, WI (US) 53150

(73) Assignee: Wallace Neil Klingensmith, New Berlin, WI (US)

( * ) Notice: Subject to any disclaimer, the term of this patent is extended or adjusted under 35 U.S.C. 154(b) by 0 days.

(21) Appl. No.: 09/032,445

(22) Filed: Feb. 27, 1998

Related U.S. Application Data (60) Provisional application No. 60/040,026, filed on Mar. 4, 1997.

(51) Int. Cl.[7] .................................................. B64C 27/08
(52) U.S. Cl. ................ 244/23 R; 244/17.11; 244/17.23; 244/76 R; 244/195
(58) Field of Search ................................ 244/181, 76 R, 244/17.13, 23 R, 23 A, 12.1, 12.5, 12.3, 23 B, 194, 195, 26; 180/116, 117

(56) References Cited

U.S. PATENT DOCUMENTS

| | | | |
|---|---|---|---|
| 2,943,822 | * 7/1960 | Hamilton | 244/76 J |
| 3,045,596 | * 7/1962 | Rae | 244/3.22 |
| 3,053,486 | * 9/1962 | Auld, Jr. | 244/177 |
| 3,296,422 | * 1/1967 | Rusler, Jr. | 244/191 |
| 4,043,421 | * 8/1977 | Smiyh | 180/117 |
| 4,378,518 | * 3/1983 | Nixon | 244/180 |
| 4,591,112 | * 5/1986 | Piasecki et al. | 244/26 |
| 4,799,629 | * 1/1989 | Mori | 244/26 |
| 4,953,098 | * 8/1990 | Fischer, Jr. et al. | 244/17.13 |
| 4,964,599 | * 10/1990 | Farineau | 244/177 |
| 5,082,079 | * 1/1992 | Lissaman et al. | 244/23 A |
| 5,669,582 | * 9/1997 | Bryant et al. | 244/195 |
| 5,823,468 | * 10/1998 | Boothe | 244/26 |

* cited by examiner

Primary Examiner—Galen L. Barefoot (57) ABSTRACT

A feedback control system for a multi-thrusted hovercraft is disclosed. In a hover craft having a plurality of vertically oriented thruster that are controlled by a system that relies on operator input and also the use of sensors to control the altitude and attitude of the hovercraft. A set of simultaneous equations is constructed and solved to reconcile the demands placed on the thrusters to maintain altitude and attitude of the hovercraft.

4 Claims, 11 Drawing Sheets

MULTI-THRUSTERED HOVER CRAFT

CROSS REFERENCE TO RELATED APPLICATIONS

This application claims benefit to provisional application No. 60/040,026 filed Mar 4, 1997.

Statement as to Rights to inventions made under Federally sponsored research and development.

Not applicable

BACKGROUND OF THE INVENTION

1. Field of the Invention

This present invention relates to a flying craft wherein the craft uses a computer-implemented control algorithm to maintain altitude control and stabilize the roll of the craft about two axes by using variations in output from fixed thrusters. Applications include, but are not restricted to, toys, hobby crafts, and crafts capable of transporting heavy or large loads.

2. Description of Prior Art

Searches were conducted in the following fields: 244/17.13; 244/76; and 244/23.

Alistair J. Jackson, U.S. Pat. No. 4,664,340, May 12, 1987, discloses a stabilization system for hovering and flying vehicles. The patent application included block diagrams which lay out in a non-specific manner the concept of using altitude controls and altitude sensors to measure the height and orientation of a hovering craft.

There are shortcomings in the control method outlined by Jackson.

First and foremost, the block diagram shown in FIG. 6 (Ref. Jackson FIG. 6) lays out the control method in only the broadest conceptual terms. It is not explained with enough specifity to enable an engineer or other practitioner familiar with the art to build it.

In order for a physically realizable feedback controller to function, among other requirements, it must apply actual numerical values of gain to the system error signals (Jackson calls these "difference signals"). The error signals are signals which represent the difference between operator commands and the current state of the craft. If indeed those feedback gains were known to Jackson, they are not specified in the patent. Because of this omission, the controller outlined could not be built as specified.

Another apparent shortcoming of Jackson's control method is that there is no formal method outlined for integrating the altitude error and the roll error to bring about the coordinated movements of the craft to simultaneously, in time, correct for roll error and altitude error. In a real flying platform, it would be desirable to perform maneuvers in which the craft simultaneously changed roll angle and altitude, as for example, simultaneously rolling from zero degrees to twenty degrees about one axis and climbing from 100 feet altitude to 150 feet. Jackson's control method does not specify how such integrated maneuvers could be carried out.

Paul S. Moller, U.S. Pat. No. 4,795,111, Jan. 3, 1989, discloses a flying platform using ducted fan engines. The invention is concerned with ducted fan engines as the means of propulsion and does not address a means of insuring stability of the craft, let alone a control algorithm.

Moller's disclosure principally addresses the specifications of the mechanical and aerodynamic problems associated with using ducted fan engines as a means of propulsion and attitude control. It is the regulation of thrust values in precise amounts which is the essence of the control problem, and Moller's disclosure does not address the specifics of how thrust values would be computed for a craft using such engines.

Lorant Forizs, U.S. Pat. No. 4,537,372, Aug. 27, 1985, discloses a two-thrustered craft which seems inherently unstable in that it would rotate freely about its long axis with no means of compensation of control.

As with the Moller disclosure, the Forizs disclosure gives no convincing description of how the craft would be stabilized in flight. Regardless of this, the lack of physical means for forcing rotation about the long axis renders the craft uncontrollable.

Cordova Maxwell Brady, U.S. Pat. No. 3,985,320, Oct. 12, 1976, relies on gyroscopic stabilizing forces for control.

As for the other disclosures mentioned, no specifics are given concerning how rotation forces would be scheduled to effect control of rotation about the craft's spatial axes.

SUMMARY OF THE INVENTION

A computerized method to maintain altitude control and stabilize the roll of a hover craft having multiple fixed thrusters.

DESCRIPTION OF THE PREFERRED EMBODIMENTS

One problem with controlling a body having rotating devices, such as spinning propellers, or jet engines with spinning turbines, is that the angular momentum of the rotating masses causes a gyroscopic effect that resists moments applied to rotate the body to a new orientation. To cancel the rotational moment produced by engines, half the engines could rotate in a direction opposite to the rotation of the other half. With or without counter rotating masses, the configurations shown in the prior art are inherently unstable in the absence of some sort of control system that regulates the action of thrust producing means to maintain a hover craft in a desired attitude at a desired altitude.

As can be seen from the prior art, there is a need for an improved and simpler method to maintain altitude control and stabilize the roll of a hover craft. As will be seen from the subsequent description of the preferred embodiments of the present invention, the shortcomings and deficiencies inherent in the present state of the art of multi-thrustered hover craft are overcome by the computerized method of the present invention.

The computerized method as shown in FIGS. 7, 8, 9, 10 and 11 of the present invention is implemented by an on-board computer, and simultaneously controls height and attitude, given control inputs that consist of:

The desired altitude h

The desired roll angle $\theta_1$

The desired roll angle $\theta_2$

Alternatively, the present method can be implemented in analog or digital hardware to accomplish the same results.

For a craft having 2n thrusters (an even number), the control algorithm compares the current values [h, $\theta_1$, $\theta_2$]$_{actual}$ to the desired values [h, $\theta_1$, $\theta_2$]$_{desired}$ and computes the thrusts $T_1, T_2 \ldots T_{2n}$ necessary to bring the actual vehicle state [h, $\theta_1$, $\theta_2$]$_{actual}$ into compliance with the desired state [h, $\theta_1$, $\theta_2$]$_{desired}$.

The control algorithm utilizes three separate feedback control loops which are linked together through a set of simultaneous equations. One control loop produces an output which is related to the error in roll angle $\theta_1$, the second produces an output which is related to the error in roll angle $\theta_2$, and the third produces an output which is related to the error in height. Here, error is the difference between the control input value and the actual value of a parameter. For example, the error in $\theta_1$ is $e_{01}=[\theta_1]_{actual}-[\theta_1]_{desired}$.

Figure 4:
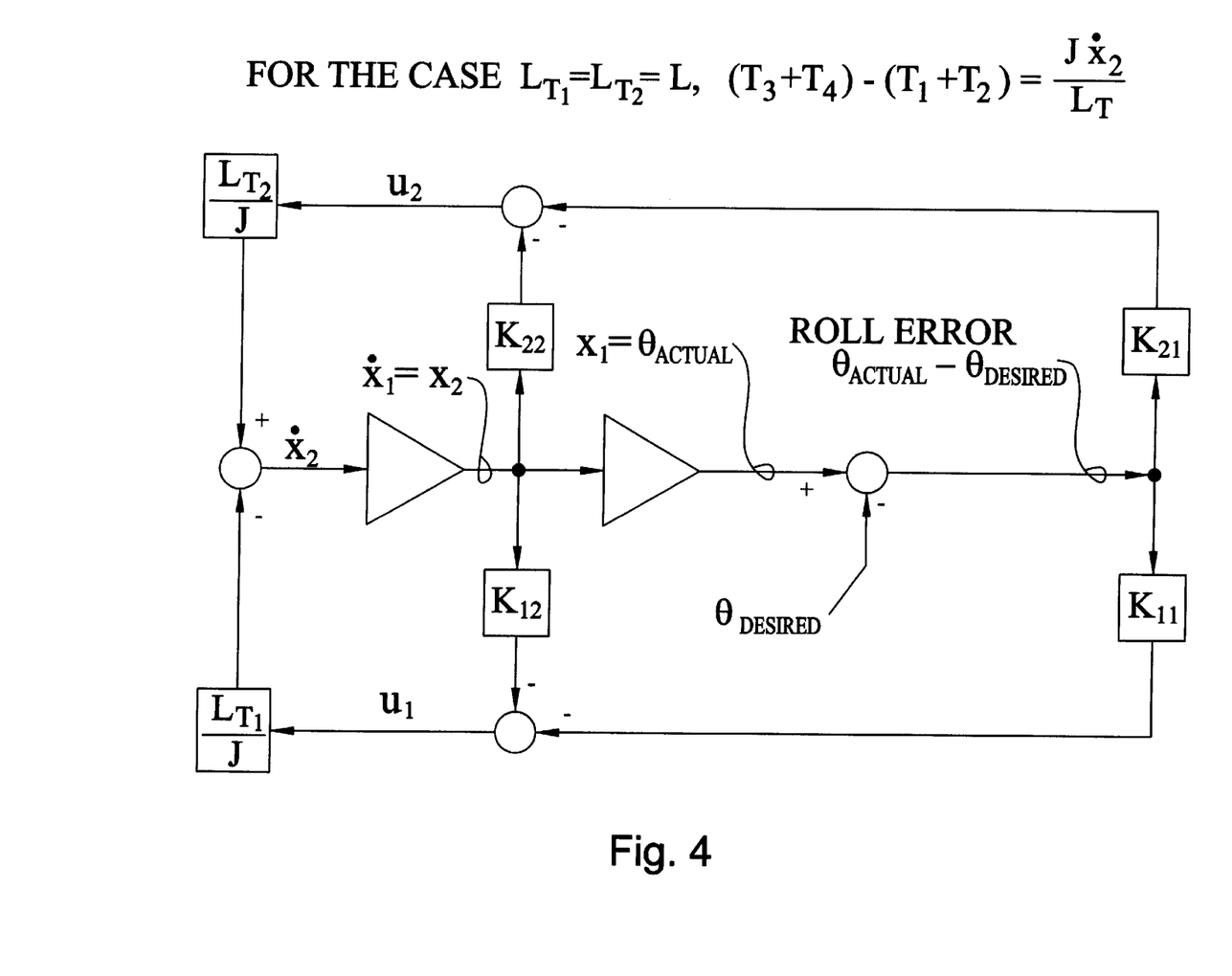
FIG. 4 is a block diagram representation of the state variable feedback employed for control of roll.

In practical use, the control input value would be provided by the operator of the craft, who could be on board the vehicle, or could control it from a remote position in the air or on the ground. In any case, the operator would use controls at his disposal to send to the onboard computer signals proportional to the desired state of the craft. For instance, a hand-held radio transmitting device could be used by an operator positioned on the ground to control the roll angle $\theta_1$. In that event, the transmitter would send a signal which would be decoded by a receiver on the craft. The radio receiver on the craft would then send a signal, $[\theta^1]_{desired}$ to the controller. The signal $\theta_{desired}$ is shown in FIG. 4 of the block diagram of the roll controller.

While hovering at the set altitude, small perturbations in the altitude and attitude of the craft would occur as a result of winds, thermals, changes in air density, and other atmospheric processes. Suppose for instance that a momentary gust of wind caused the craft to roll about axis number 1 by 2°. Then the roll angle error $e_{01}$ would be:

$$e_{01}=[\theta_1]_{actual}-[\theta_1]_{desired}=2°-0°=2°$$

In the roll-control algorithm that controls roll about axis number 1, this error would be used to calculate a difference in thrusts that would restore the craft to its desired orientation.

Since the altitude of the craft must also be controlled, for a craft having 2n thrusters, an altitude control algorithm is used to compute the sums of thrusts $T_1+T_2+\ldots+T_{2n}$ that will restore the altitude to the desired value. If, for instance, the operator of the craft specified a desired altitude of 1000 ft. and the current altitude was 900 ft., the onboard altitude controller would compute a thrust sum that would restore the craft to the desired altitude.

At any given instant the errors in h, $\theta_1$, and $\theta_2$ would cause the attitude and altitude controllers to each compute thrusts $T_1, T_2, \ldots T_n$ required to correct the state of the craft [h, $\theta_1$, and $\theta_2$]. In general, each of the three controllers would compute different thrusts that would correspond to the optimal thrusts for their respective state elements. A set of simultaneous equations is constructed and solved to reconcile the demands placed on the thrusters by the three controllers.

Figure 1:
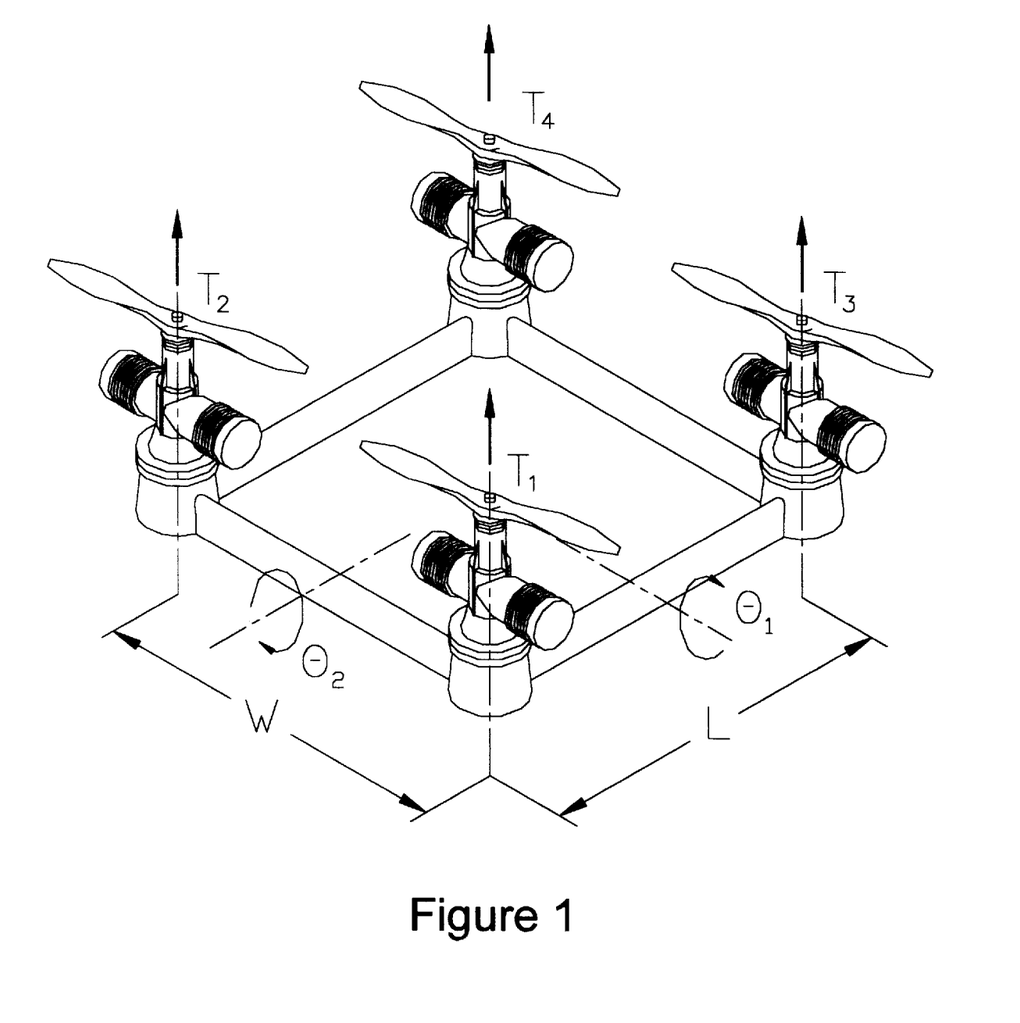
FIG. 1 is an isometric view of a multi-thrustered hover craft.
Figure 3:
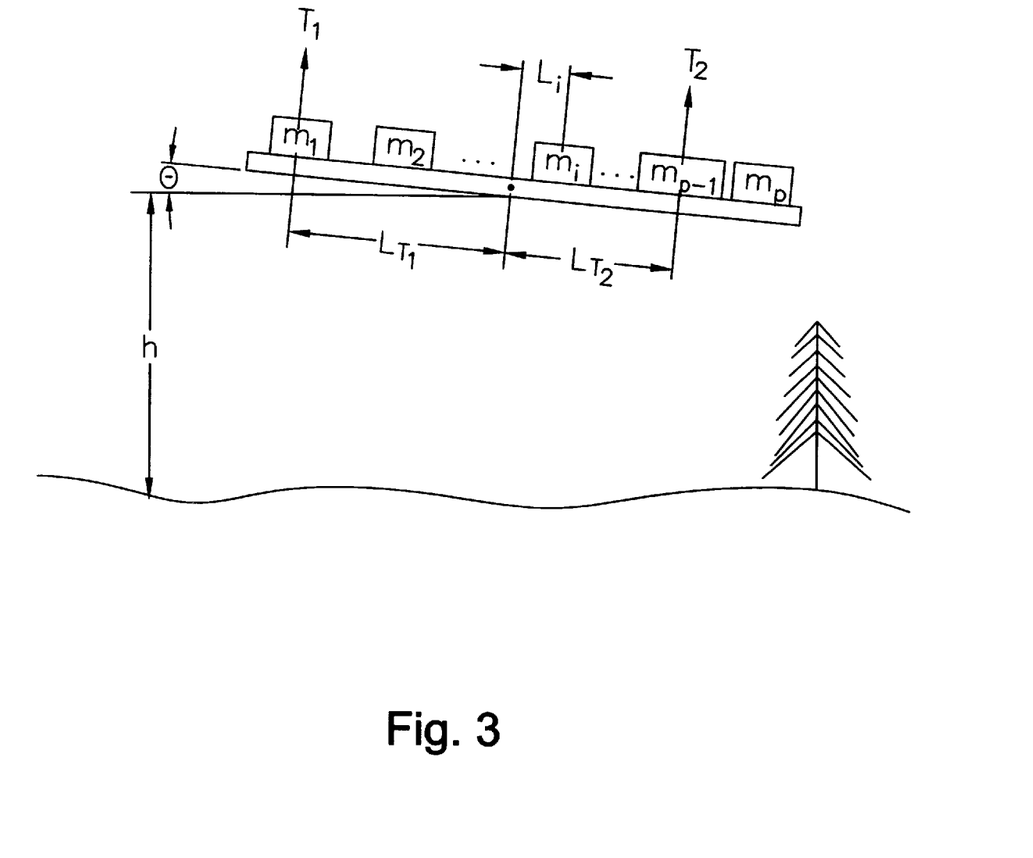
FIG. 3 is a simplified free body diagram illustrating dimensions and angles used in the explanation of the control algorithms.

The roll-control algorithm receives orientation inputs from two sensors that measure roll angles $\theta_1$ and $\theta_2$ about two orthogonal axes located in a plane parallel to the plane of the body of the craft (see FIGS. 1 and 3). For a craft having four thrusters, this algorithm samples the roll angles $\theta_1$ and $\theta_2$ at frequent intervals, and from the roll information, calculates thrusts $T_1, T_2, T_3$, and $T_4$ needed to correct the roll about axes 1 and 2. Since roll about axis 1 is independent of roll about axis 2, the roll-correction algorithm is itself separable, and is broken into two parts, one for correcting roll angle $\theta_1$ and the other for correcting roll angle $\theta_2$. For the four-thruster version of the craft shown in FIG. 1, roll about axis 1 is controlled by the difference between thrust sums $(T_1+T_2)$ and $(T_3+T_4)$. That is, if the sum of forces $(T_1+T_2)$ is greater than the sum of forces $(T_3+T_4)$, then the craft will roll in a positive angular direction about axis 1, as shown in FIG. 3, and the roll rate $\dot\theta=d\theta_1/dt$ will be related to the magnitude of the difference. Similarly, roll about axis 2 is controlled by the difference between thrust sums $(T_2+T_4)$ and $(T_1+T_3)$. Thus, control of the roll orientation of the craft is accomplished by controlling the following thrust quantities:

$(T_1+T_2)-(T_3+T_4)$; Used to control $\theta_1$ and $d\theta_1/dt$     Eq. 1)

$(T_2+T_4)-(T_1+T_3)$; Used to control $\theta_2$ and $d\theta_2/dt$     Eq. 2)

Looking at just the roll angle $\theta_1$ about axis 1, if at some point in time $\theta_1$ is not equal to its desired value, then it can be pushed toward its desired value by a restoring torque about axis 1. The relation between a restoring torque T and the rotational acceleration of the vehicle about axis 1 is:

$\tau=J_1\ddot\theta_1$     Eq. 3)

where $J_1$ is the moment of inertia of the vehicle about axis 1, and $\ddot\theta_1$ is the second time derivative of $\theta_1$. The restoring moment T about axis 1 is proportional to the difference between the sum of thrusts $(T_3+T_4)$ and the sum of thrusts $(T_1+T_2)$. Thus, for the four-thrustered craft shown in FIG. 1, if L is the length of the craft on the side perpendicular to axis 1, and all thrusters are located distance L/2 from axis 1 then:

$\tau=[(T_3+T_4)-(T_1+T_2)]*(L/2)$     Eq. 4)

Eq. 5) $\quad \ddot\theta_1 = \left[\dfrac{(T_3+T_4)-(T_1+T_2)}{2*J_1}\right]*L$ For the general case in which the pair of thrusters $T_3, T_4$ is not equally spaced from the pair $T_1, T_2$ and in which $T_1$ and $T_2$ are spaced at a distance $L_{T1}$ and the pair $T_3, T_4$ are spaced at a distance $L_{T2}$ from the centroidal axis, these expressions become:

$\tau=(T_3+T_4)L_{T2}-(T_1+T_2)L_{T1}$     Eq. 6)

$\ddot\theta_1=((T_3+T_4)L_{T2}-(T_1+T_2)L_{T1})/J_1$     Eq. 7)

The system states are assigned as follows:

$x_1=\theta_1, \dot x_1=x_2=\dot\theta_1$     Eq. 8)

Then the state variable equation for the system is:

Eq. 9) $\begin{bmatrix} \dot{x}_1 \\ \dot{x}_2 \end{bmatrix} = \begin{bmatrix} 1 & 0 \\ 0 & 1 \end{bmatrix} \begin{bmatrix} x_2 \\ \ddot{\theta} \end{bmatrix}$ where $\theta_1$ is given in Eq. 5) or Eq. 7) above. FIG. 4 illustrates the resulting state variable feedback controller for roll, and shows the feedback gains (labeled $K_{11}$, $K_{12}$, $K_{21}$, and $K_{22}$) employed to produce control outputs $u_1$ and $u_2$. The control outputs $u_1$ and $u_2$ have units of force, and represent the instantaneous values of thrust needed to correct a non-zero error in the roll angle, $\theta_{actual} - \theta_{desired}$. The feedback gains $K_{11}$, $K_{12}$, $K_{21}$, and $K_{22}$ are given by:

Eq. 10) $K_{11} = \dfrac{\lambda_2 J\left(\alpha\lambda_1^2 + \dfrac{\beta L_{T2}}{J}\right)}{\alpha L_{TI}(\lambda_2 - \lambda_1)} - \dfrac{\lambda_2 J\left(\gamma\lambda_2^2 + \dfrac{\delta L_{T2}}{J}\right)}{\gamma L_{TI}(\lambda_2 - \lambda_1)}$ Eq. 11) $K_{12} = \dfrac{J\left(\gamma\lambda_2^2 + \dfrac{\delta L_{T2}}{J}\right)}{\gamma L_{TI}(\lambda_2 - \lambda_1)} - \dfrac{J\left(\alpha\lambda_1^2 + \dfrac{\beta L_{T2}}{J}\right)}{\alpha L_{TI}(\lambda_2 - \lambda_1)}$ Eq. 12) $K_{21} = \dfrac{\beta\lambda_2}{\alpha(\lambda_2 - \lambda_1)} - \dfrac{\delta\lambda_1}{\gamma(\lambda_2 - \lambda_1)}$ Eq. 13) $K_{22} = \dfrac{\delta}{\gamma(\lambda_2 - \lambda_1)} - \dfrac{\beta}{\alpha(\lambda_2 - \lambda_1)}$ In the computation of feedback gains $K_{11}$, $K_{12}$, $K_{21}$, and $K_{22}$, the values $\alpha$, $\beta$, $\gamma$, and $\delta$ are arbitrary constants for which the ratios $\beta/\alpha$ and $\delta/\gamma$ have units of force. The values $\lambda_1$ and $\lambda_2$ are negative real-valued system eigenvalues that control the rate at which the roll angle $\theta_{actual}$ converges on the control input value of roll angle $\theta_{desired}$.

Figure 2:
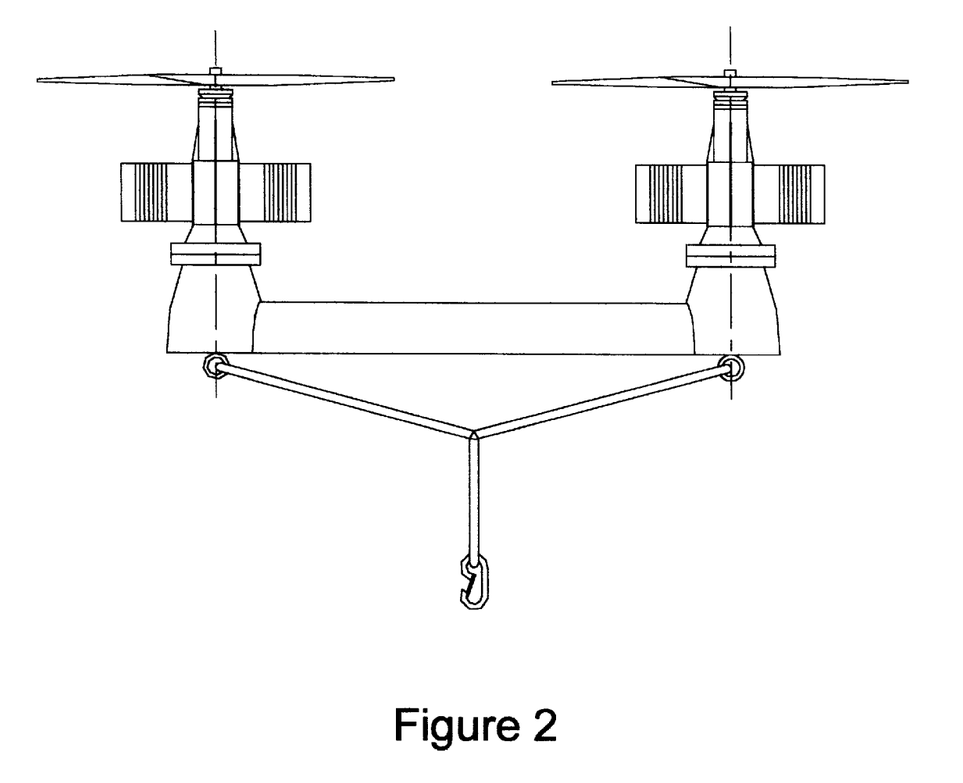
FIG. 2 is a side view of the multi-thrustered hover craft with a hook and cable for attaching loads.

The altitude control algorithm receives altitude inputs from an altitude sensor. These altitude readings are sampled at frequent intervals and are used to calculate the sum of thrusts required to control the altitude of the craft. For the four-thrustered craft of FIG. 1 (or any craft with any number of thrusters oriented in an upright configuration as in FIG. 1) and FIG. 2), the sum of vertical components of thrust is used to control altitude h and the rate of change of altitude $\dot{h} = d\theta/dt$.

At any given time, the following equation relates the sum of vertical forces to the mass of the craft and its vertical acceleration:

$\Sigma F_y = ma$ \hfill Eq. 14)

where forces $F_y$ are vertically-directed, m is the total mass of the vehicle, and a is the acceleration of the vehicle in the vertical direction. If $\theta$ is the roll-angle of the vehicle, then for a vehicle having four thrusters and p masses as in FIG. 1 and 3:

Eq. 15) $\displaystyle\sum_{i=1}^{4}(F_y)_i = ma$ $= (T_1 + T_2 + T_3 + T_4)\cos(\theta) - g\left(\displaystyle\sum_{j=1}^{P} m_j\right)$ $= \left(\displaystyle\sum_{j=1}^{P} m_j\right) * \dfrac{d^2 h}{dt^2}$ Since $g\left(\displaystyle\sum_{j=1}^{P} m_j\right) = w$ the weight of the craft:

Eq. 16) $(T_1 + T_2 + T_3 + T_4)\cos(\theta) - w = \left(\displaystyle\sum_{j=1}^{P} m_j\right) * \dfrac{d^2 h}{dt^2}$ Eq. 17) $\dfrac{d^2 h}{dt^2} = \dfrac{(T_1 + T_2 + T_3 + T_4) * \cos(\theta) - w}{\displaystyle\sum_{i=t}^{P} m_i}$ Make the substitutions: $T = (T_1 + T_2 + T_3 + T_4)$ and $\dfrac{w}{\displaystyle\sum_{i=t}^{P} m_i} = g,$ where g is the gravitational acceleration, and setting the acceleration equal to the system input:

Eq. 18) $\dfrac{d^2 h}{dt^2} = \dfrac{T * \cos(\theta)}{\displaystyle\sum_{i=t}^{P} m_i} - g = u$ By solving Eq. 16) for T, the total thrust T required to accelerate the vehicle with an acceleration equal to $u = \dfrac{d^2 h}{dt^2}$ is:

Eq. 19) $T = \dfrac{(u + g)\displaystyle\sum_{i=t}^{P} m_i}{\cos(\theta)}$

Figure 5:
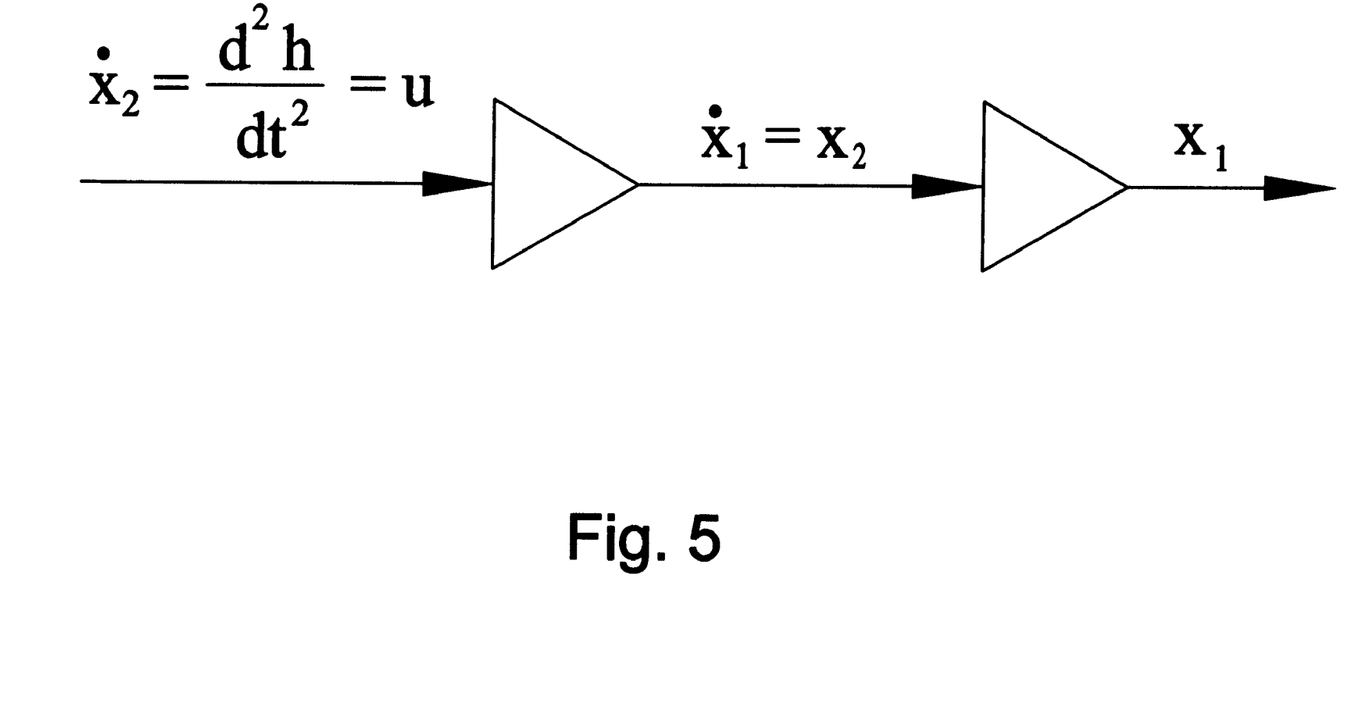
FIG. 5 is a block diagram representation of an open loop state variable model of an altitude controller.

The system states are assigned as follows:

Eq. 20) $x_1 = h \quad \dot{x}_1 = x_2 = \dfrac{dh}{dt} \quad \dot{x}_2 = \dfrac{d^2 h}{dt^2} = u$ where u is the open-loop input. The state variable equations are:

Eq. 21) $\begin{bmatrix} \dot{x}_1 \\ \dot{x}_2 \end{bmatrix} = \begin{bmatrix} 0 & 1 \\ 0 & 0 \end{bmatrix} \begin{bmatrix} x_1 \\ x_2 \end{bmatrix} + \begin{bmatrix} 0 \\ 1 \end{bmatrix}[u]$ FIG. 5 shows the open loop model of the altitude controller, before state variable feedback is applied.

Figure 6:
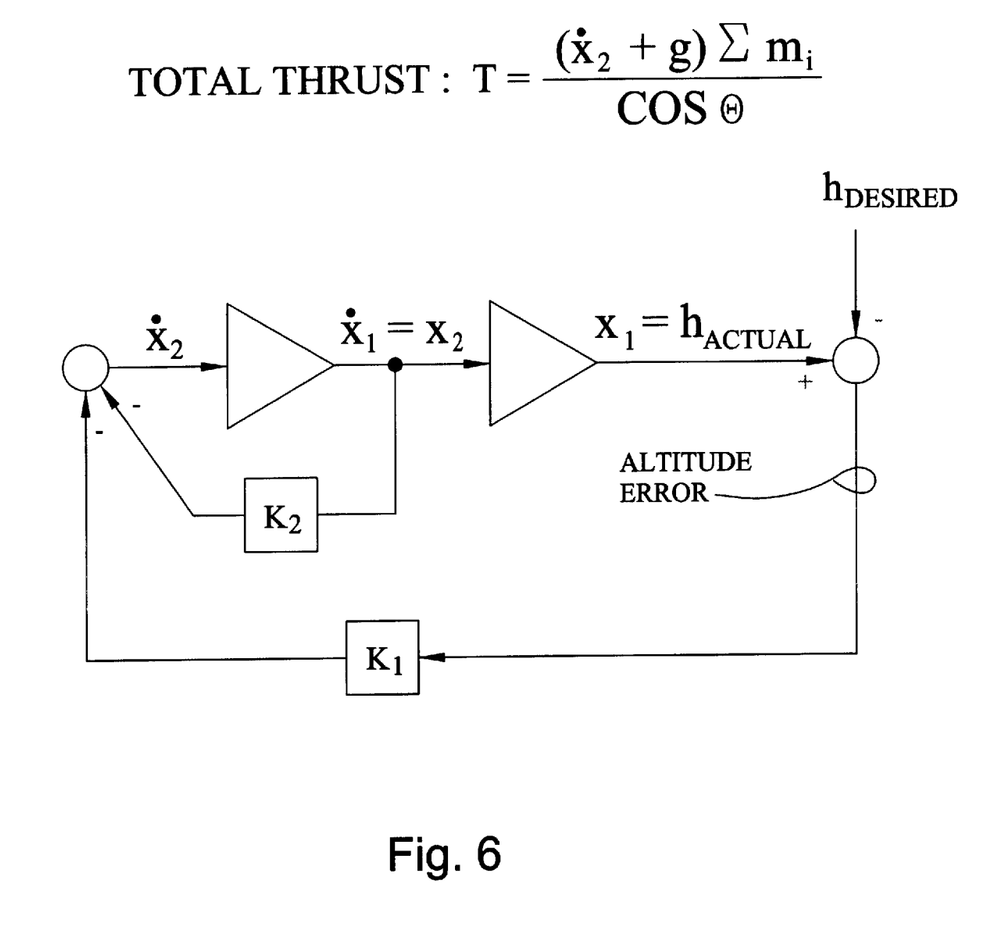
FIG. 6 is a block diagram representation of a state variable feedback for control of altitude.
Figure 7:
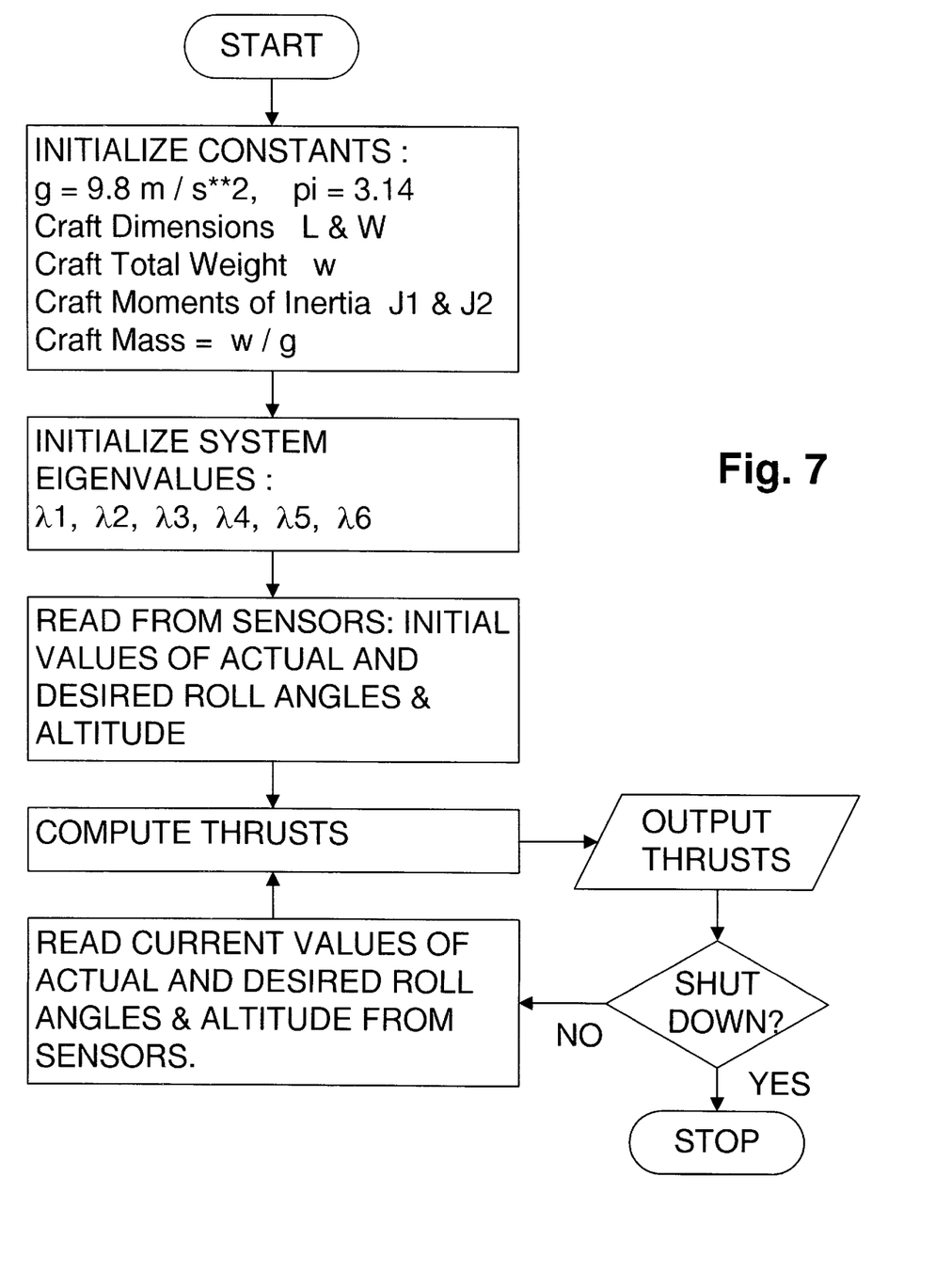
FIG. 7 is a flow chart of the overall operation of the computer software system.
Figure 8:
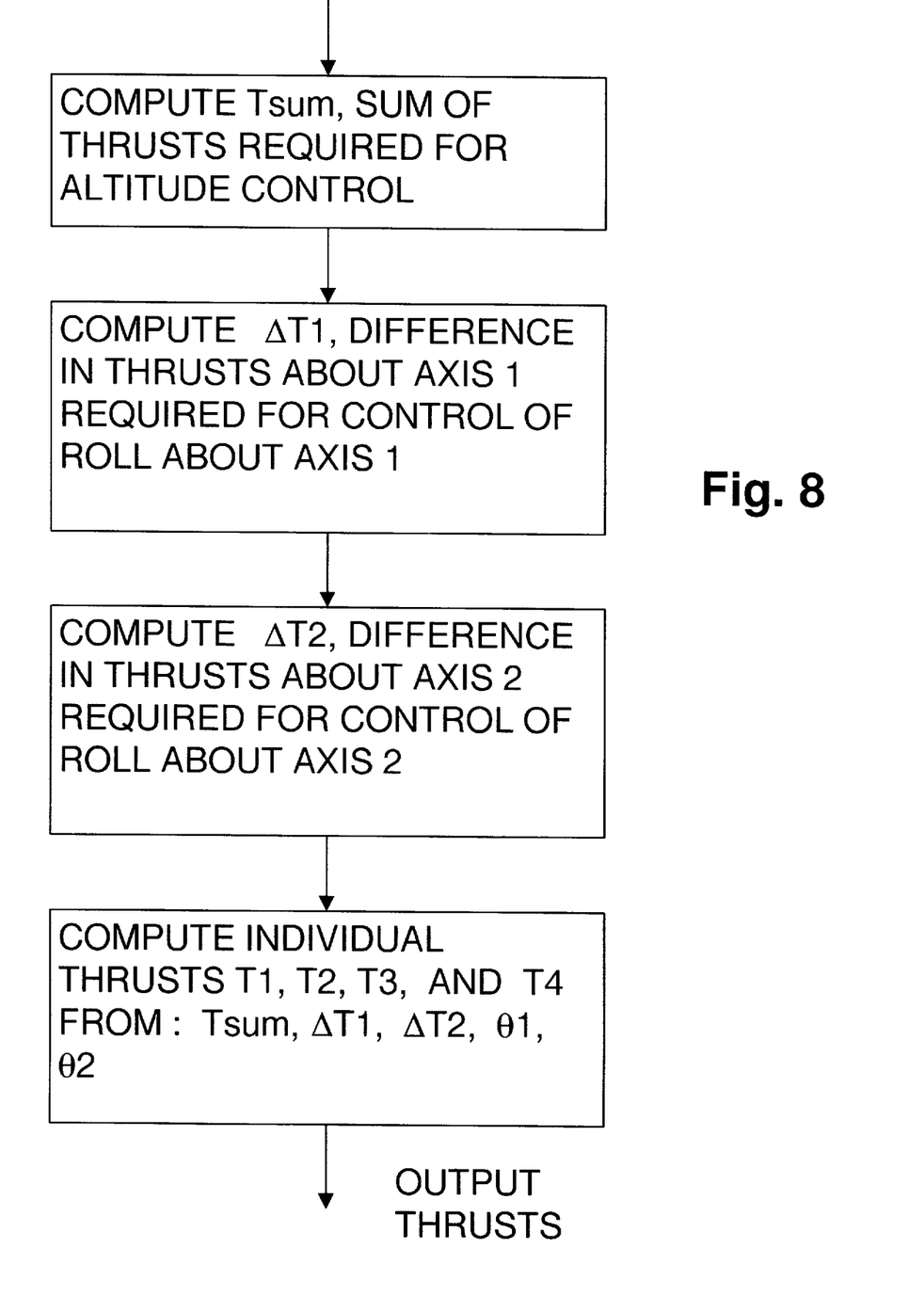
FIG. 8 is a flow chart which expands the block "Compute Required Thrust" of FIG. 7.
Figure 9:
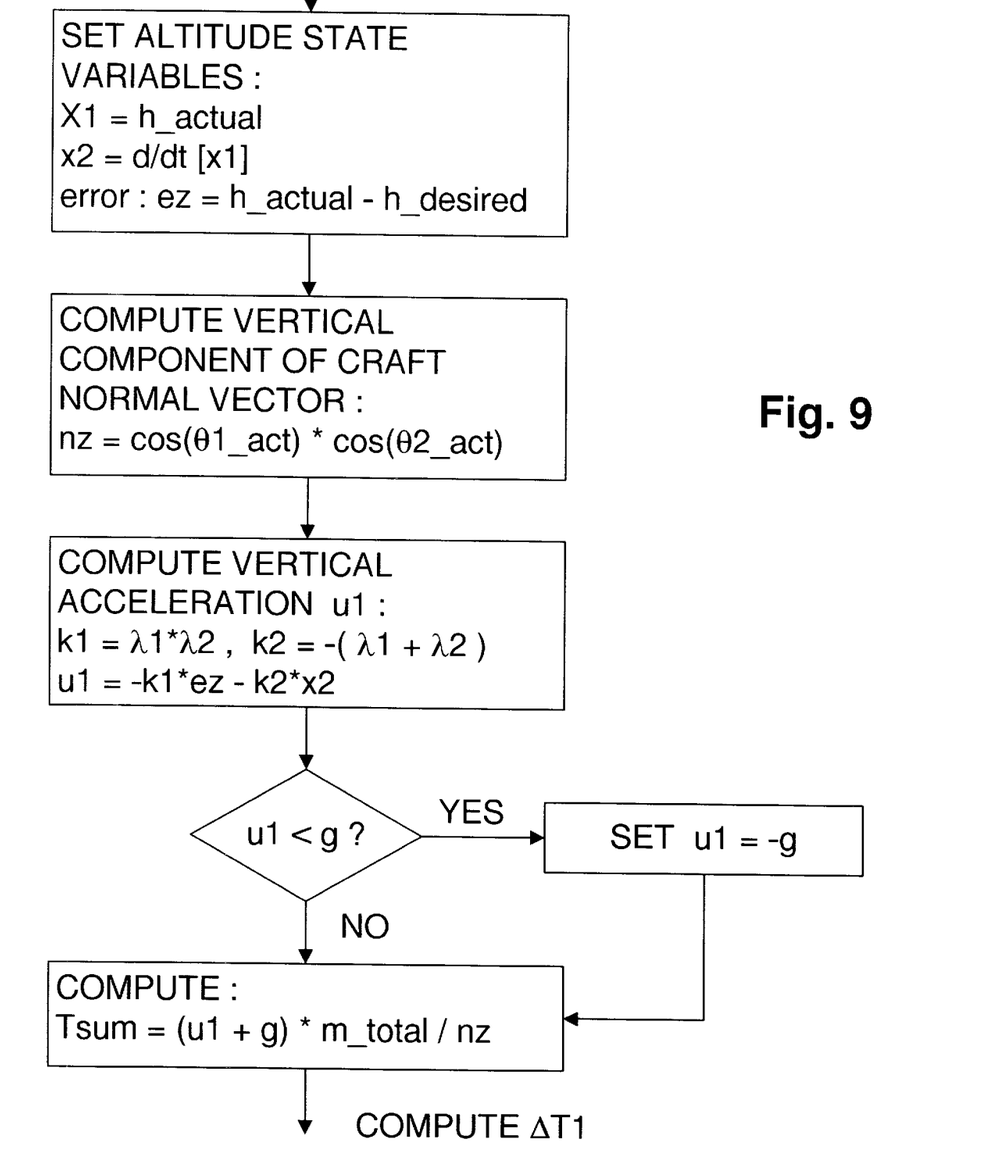
FIG. 9 is a flow chart which expands the block "Compute Tsum" of FIG. 8.
Figure 10:
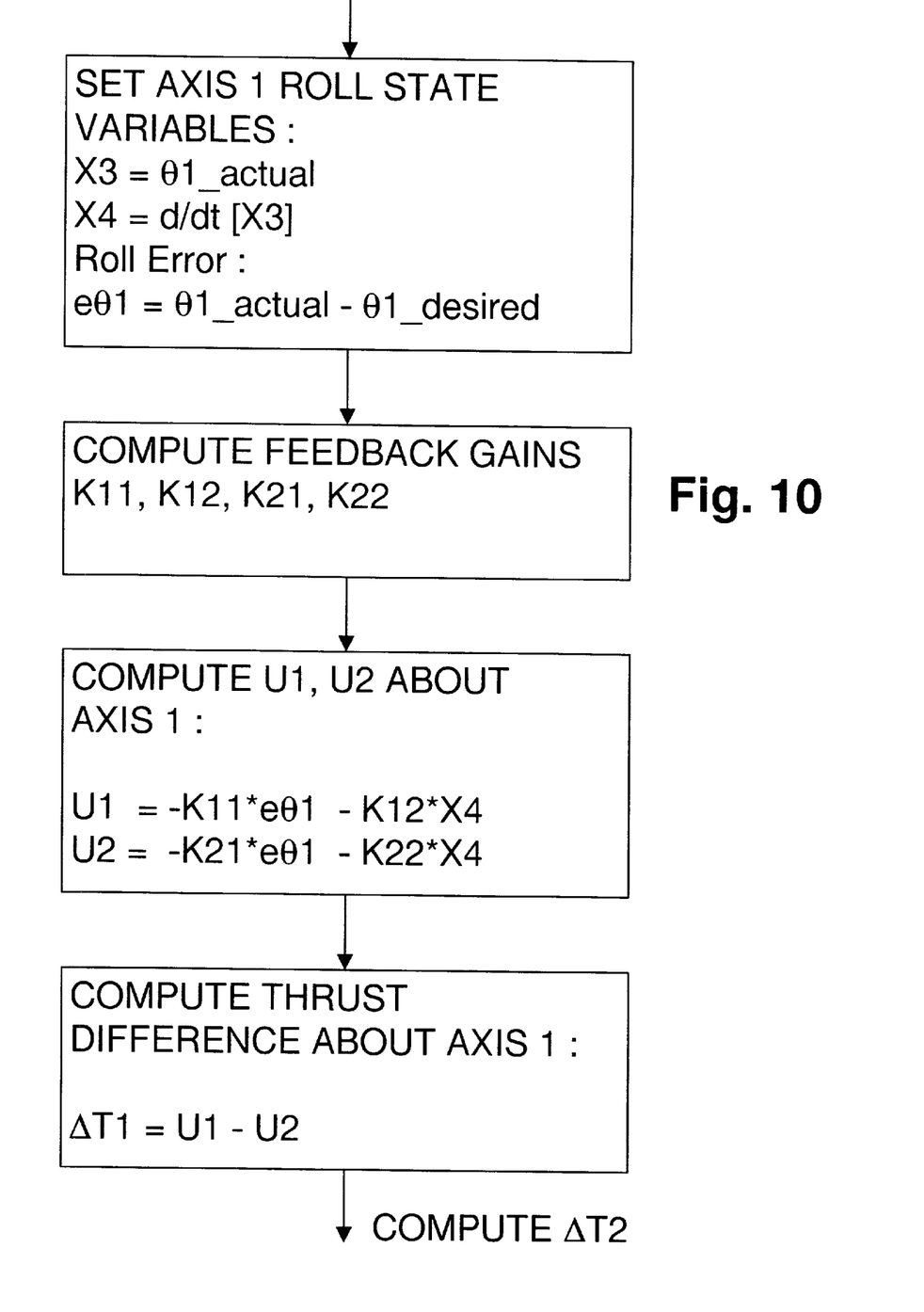
FIG. 10 is a flow chart which expands the block "Compute $\Delta T_1$" of FIG. 8.
Figure 11:
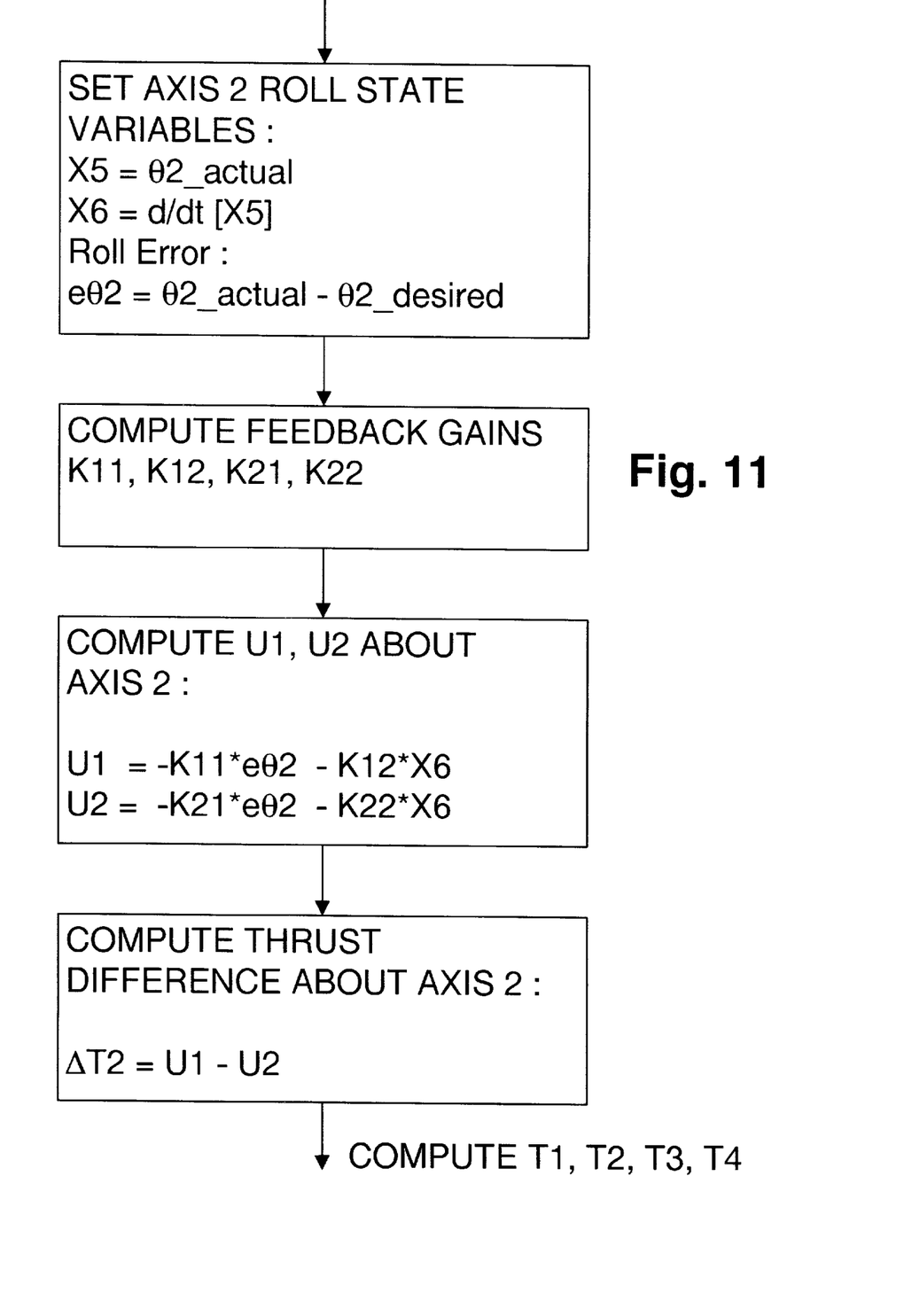
FIG. 11 is a flow chart which expands the block "Compute $\Delta T_2$" of FIG. 8.

After applying state feedback compensation to the state variable system, the resulting closed-loop feedback controller is as shown in FIG. 6. This figure illustrates the resulting state variable feedback controller for altitude, and shows the feedback gains (labeled $K_1$ and $K_2$) employed to produce feedback control output u. The control signal u has units of acceleration, and represents the instantaneous difference between the upward acceleration of the craft and the gravitational acceleration. The feedback gains $K_1$ and $K_2$ are given by:

$$K_1 = \lambda_1 \lambda_2 \qquad \text{Eq. 22)}$$

$$K_2 = (\lambda_1 + \lambda_2) \qquad \text{Eq. 23)}$$

where $\lambda_1$ and $\lambda_2$ are negative real-valued system eigenvalues that control the rate at which the actual height value $h_{actual}$ converges on the desired height value $h_{desired}$. The acceleration input is:

$$\text{Eq. 24)} \quad [u] = [K_1 \quad K_2]\begin{bmatrix} e \\ x_2 \end{bmatrix}$$

where $e = x_1 - h_{desired} = h_{actual} - h_{desired}$ is the error in the altitude.

To summarize, the roll-control algorithms specify thrust differences that are needed to correct an error in the roll orientation of the craft, and the altitude-control algorithm specifies a thrust sum that is needed to correct an error in the altitude of the craft. For instance, for the four-thrustered craft illustrated in FIG. 1, at a given point in time the controllers that correct the roll about axes 1 and 2 and the controller that corrects altitude provide the following three equations:

The axis 1 roll controller computes the following thrust difference required to restore $\theta_1$ to its desired value:

$$(T_1+T_2)-(T_3+T_4)=C_1 \qquad \text{Eq. 25)}$$

The axis 2 roll controller computes the following thrust difference required to restore $\theta_2$ to its desired value:

$$(T_1+T_3)-(T_2+T_4)=C_2 \qquad \text{Eq. 26)}$$

The altitude controller computes the following thrust sum required for restoring h to its desired value:

$$(T_1+T_2+T_3+T_4)=C_3 \qquad \text{Eq. 27)}$$

In Eqs. 25), 26), and 27) above, $C_1$, $C_2$, and $C_3$ are all constants having units of force. The value $C_1$ is specified by the roll controller for axis 1. The value $C_2$ is specified by the roll controller for axis 2. The value $C_3$ is specified by the altitude controller.

Eqs. 25), 26), and 27) represent three equations in four unknowns, $T_1$, $T_2$, $T_3$, and $T_4$. A fourth equation is needed to obtain a full set of four equations in four unknowns. One way this fourth equation can be obtained is by setting one of the thrusts to a selected constant value. For instance, when the vehicle reaches its equilibrium state, the required thrusts reach constant equilibrium values. So, one approach is to pick one thruster, compute its value at the equilibrium state of the vehicle, and assign it that constant value of thrust. For purposes of illustration, suppose that thruster number one is assigned the following thrust value:

$$T_1 = C_4 \qquad \text{Eq. 28)}$$

then expression 25) through 28) are equivalent to the following set of simultaneous equations:

$$\text{Eq. 29)} \quad \begin{bmatrix} -1 & -1 & 1 & 1 \\ 1 & -1 & 1 & -1 \\ 1 & 1 & 1 & 1 \\ 1 & 0 & 0 & 0 \end{bmatrix} \begin{bmatrix} T_1 \\ T_2 \\ T_3 \\ T_4 \end{bmatrix} = \begin{bmatrix} C_1 \\ C_2 \\ C_3 \\ C_4 \end{bmatrix}$$

Solution of the set of equations in 29) yields the thrusts that simultaneously correct roll error and altitude error. Actuators on the thrusters set the thrusts to the values solved for in Eq. 29), and the craft assumes the desired state $[h, \theta_1, \theta_2]_{desired}$.

I claim:

1. A method for forcing the altitude of a flying or hovering craft having three or more thrusters to an arbitrary operator-commanded altitude value, the method comprising:

determination of discrete points in time $t_{k-1}$, $t_k$, $t_{k+1}$, each point in time being separated by a fixed time interval $\Delta t$;

determination, at the time point $t_k$, of the value of the state variable $\dot{x}_2$ representing vertical acceleration of the craft, the vertical acceleration being measured by sensors located on the craft;

determination, at the time point $t_k$, of the value of the state variable $X_2$ representing vertical velocity of the craft, the vertical velocity being measured, or computed as the vertical velocity at the previous time point $t_{k-1}$, plus the vertical acceleration at the previous time point multiplied by the time interval $\Delta t$;

determination, at the time point $t_k$, of the value of the state variable $X_1$ representing the actual altitude of the craft;

determination, at the time point $t_k$, of the altitude error of the craft, the error being computed as the difference between the actual altitude $h_{actual}$ and the operator-commanded altitude $h_{desired}$ as $h_{error} = h_{actual} - h_{desired}$;

computation, at the time point $t_k$, of state feedback gains $K_1$ and $K_2$;

computation, at the time point $t_k$, of the vertical component v of the normal vector to the principal plane of the vehicle, said vertical component being $v = \cos(\theta 1_{actual}) \cdot \cos(\theta 2_{actual})$, and $\theta 1_{actual}$ and $\theta 2_{actual}$ being the actual values of roll angle about axis 1 and axis 2 respectively;

computation, at the time point $t_k$, of the vertical acceleration $u_k$ which will restore the altitude to its operator-commanded value, said acceleration being calculated as the difference $u_k = -k_1 \cdot [h_{error}]_{k-1} - k_2 [X_2]_{k-1}$;

computation, at the time point $t_k$, of the total thrust $T_{sum}$ which will create the vertical acceleration required to restore the altitude to its operator-commanded value, said total thrust being calculated as $$T_{sum} = \{u_k + g\} * \frac{m}{v},$$

m being the total mass of the craft, and g being the gravitational acceleration;

update of the altitude state variables for use in the state calculations at the next time point, specifically $[X_1]_{k-1} = [X_1]_k$, $[X_2]_{k-1} = [X_2]_k$, $[\dot{X}_2]_{k-1} = [\dot{X}_2]_k$;

application of the computed total thrust to the control of the thrusters to maintain the desired altitude.

2. A method for forcing the axis-1 roll angle of a flying or hovering craft having three or more thrusters to an arbitrary operator-commanded roll value, the method comprising:

determination of discrete points in time $t_{k-1}$, $t_k$, $t_{k+1}$, each point in time being separated by a fixed time interval $\Delta t$;

determination, at the time point $t_k$, of the value of the state variable $\dot{X}_4$ representing roll angle acceleration of the craft about axis 1 passing through the mass centroid of the craft, the roll angle acceleration being measured by sensors located on the craft;

determination, at the time point $t_k$, of the value of the state variable $X_4$ representing roll velocity of the craft about axis 1, the roll velocity being measured, or computed as the roll velocity at the previous time point $t_{k-1}$, plus the roll acceleration at the previous time point multiplied by the time interval $\Delta t$;

determination, at the time point $t_k$, of the value of the state variable $X_3=\theta_{actual}$ representing roll angle of the craft about axis 1, the roll angle being measured, or computed as the roll angle at the previous time point $t_{k-1}$, plus the roll velocity at the previous time point multiplied by the time interval $\Delta t$;

determination, at the time point $t_k$, of the value of the roll angle error $\theta_e$ of the craft about axis 1, the error being computed as the difference between the actual roll angle $\theta_{actual}$ and the operator-commanded roll angle $\theta_{desired}$ as $\theta_e=\theta_{actual}-\theta_{desired}$;

computation, at the time point $t_k$, of state feedback gains $K_{11}$, $K_{12}$, $K_{21}$, and $K_{22}$ for axis 1;

computation, at the time point $t_k$, of the thrust difference $T_{diff_1}$ about axis 1 which will restore the axis 1 roll value to its operator-commanded value, said thrust difference being calculated as the difference $$\{[k_{11}]*[\theta_e]_{k-1}+[k_{12}]*[X_4]_{k-1}\}*\frac{L_{T1}}{J}-$$
$$\{[k_{21}]*[\theta_e]_{k-1}+[k_{22}]*[X_4]_{k-1}\}*\frac{L_{T2}}{J};$$

where J is the rotational moment of the craft about the axis, and $L_{T1}$ and $L_{T2}$ represent either the actual lateral distance of the thrusters from the axis, or the equivalent lateral distances of two equivalent single thrusters located on opposite sides of the axis;

update of the axis 1 state variables for use in the state calculations at the next time point, specifically $[X_3]_{k-1}=[X_3]_k$, $[X_4]_{k-1}=[X_4]_k$, $$[\dot{X}_4]_{k-1}=[\dot{X}_4]_k.$$

applying the computed thrust differences to the control of the thrusters to maintain the desired roll value.

3. A method for forcing the axis-2 roll angle of a flying or hovering craft having three or more thrusters to an arbitrary operator-commanded roll value, the method comprising:

determination of discrete points in time $t_{k-1}$, $t_k$, $t_{k+1}$, each point in time being separated by a fixed time interval $\Delta t$;

determination, at the time point $t_k$, of the value of the state variable $\dot{X}_6$ representing roll angle acceleration of the craft about axis 2 passing through the mass centroid of the craft, the roll angle acceleration being measured by sensors located on the craft;

determination, at the time point $t_k$, of the value of the state variable $X_6$ representing roll velocity of the craft about axis 2, the roll velocity being measured, or computed as the roll velocity at the previous time point $t_{k-1}$, plus the roll acceleration at the previous time point multiplied by the time interval $\Delta t$;

determination, at the time point $t_k$, of the value of the state variable $X_5=\theta_{actual}$ representing roll angle of the craft about axis 2, the roll angle being measured, or computed as the roll angle at the previous time point $t_{k-1}$, plus the roll velocity at the previous time point multiplied by the time interval $\Delta t$;

determination, at the time point $t_k$, of the value of the roll angle error $\theta_e$ of the craft about axis 2, the error being computed as the difference between the actual roll angle $\theta_{actual}$ and the operator-commanded roll angle $\theta_{desired}$ as $\theta_e=\theta_{actual}-\theta_{desired}$;

computation, at the time point $t_k$, of state feedback gains $K_{11}$, $K_{12}$, $K_{21}$, and $K_{22}$ for axis 2;

computation, at the time point $t_k$, of the thrust difference $T_{diff_2}$ about axis 2 which will restore the axis 2 roll value to its operator-conunanded value, the magnitude of said thrust difference being calculated as the difference $$\{[k_{11}]*[\theta_e]_{k-1}+[k_{12}]*[X_6]_{k-1}\}*\frac{L_{T1}}{J}-$$
$$\{[k_{21}]*[\theta_e]_{k-1}+[k_{22}]*[X_6]_{k-1}\}*\frac{L_{T2}}{J};$$

where J is the rotational moment of the craft about the axis, and $L_{T1}$ and $L_{T2}$ represent either the actual lateral distance of the thrusters from the axis, or the equivalent lateral distances of two equivalent single thrusters located on opposite sides of the axis;

update of the axis 2 state variables for use in the state calculations at the next time point, specifically $[X_5]_{k-1}=[X_5]_k$, $[X_6]_{k-1}=[X_6]_k$, $$[\dot{X}_6]_{k-1}=[\dot{X}_6]_k.$$

applying the computed thrust differences to the control of the thrusters to maintain the desired roll value.

4. A method for integrating and combining the altitude control, axis-1 roll control, and axis-2 roll control of a flying or hovering craft having three or more thrusters to arbitrary operator-commanded values and comprising:

determination of discrete points in time $t_{k-1}$, $t_k$, $t_{k+1}$, each point in time being separated by a fixed time interval $\Delta t$;

determination, at the time point $t_k$, of the value of the state variable $\dot{x}_2$ representing vertical acceleration of the craft, the vertical acceleration being measured by sensors located on the craft;

determination, at the time point $t_k$, of the value of the state variable $X_2$ representing vertical velocity of the craft, the vertical velocity being measured, or computed as the vertical velocity at the previous time point $t_{k-1}$, plus the vertical acceleration at the previous time point multiplied by the time interval $\Delta t$;

determination, at the time point $t_k$, of the value of the state variable $X_1$ representing the actual altitude of the craft;

determination, at the time point $t_k$, of the altitude error of the craft, the error being computed as the difference between the actual altitude $h_{actual}$ and the operator-commanded altitude $h_{desired}$ as $h_{error}=h_{actual}-h_{desired}$;

computation, at the time point $t_k$, of state feedback gains $K_1$ and $K_2$;

computation, at the time point $t_k$, of the vertical component v of the normal vector to the principal plane of the vehicle, said vertical component being $v=\cos(\theta 1_{actual})*\cos(\theta 2_{actual})$, and $\theta 1_{actual}$ and $\theta 2_{actual}$ being the actual values of roll angle about axis 1 and axis 2 respectively;

computation, at the time point $t_k$, of the vertical acceleration $u_k$ which will restore the altitude to its operator-commanded value, said acceleration being calculated as the difference $u_k=-k_1*[h_{error}]_{k-1}-k_2[X_2]_{k-1}$;

computation, at the time point $t_k$, of the total thrust $T_{sum}$ which will create the vertical acceleration required to restore the altitude to its operator-commanded value, said total thrust being calculated as $$T_{sum} = \{u_k + g\} * \frac{m}{v},$$

m being the total mass of the craft, and g being the gravitational acceleration;

update of the altitude state variables for use in the state calculations at the next time point, specifically $[X_1]_{k-1}=[X_1]_k$, $[X_2]_{k-1}=[X_2]_k$, $[\dot{X}_2]_{k-1}=[\dot{X}_2]_k$;

application of the computed total thrust to the control of the thrusters to maintain the desired altitude;

determination, at the time point $t_k$, of the value of the state variable $\dot{X}_4$ representing roll angle acceleration of the craft about axis 1 passing through the mass centroid of the craft, the roll angle acceleration being measured by sensors located on the craft;

determination, at the time point $t_k$, of the value of the state variable $X_4$ representing roll velocity of the craft about axis 1, the roll velocity being measured, or computed as the roll velocity at the previous time point $t_{k-1}$, plus the roll acceleration at the previous time point multiplied by the time interval $\Delta t$;

determination, at the time point $t_k$, of the value of the state variable $X_3 = \theta_{actual}$ representing roll angle of the craft about axis 1, the roll angle being measured, or computed as the roll angle at the previous time point $t_{k-1}$, plus the roll velocity at the previous time point multiplied by the time interval $\Delta t$;

determination, at the time point $t_k$, of the value of the roll angle error $\theta_e$ of the craft about axis 1, the error being computed as the difference between the actual roll angle $\theta_{actual}$ and the operator-commanded roll angle $\theta_{desired}$ as $\theta_e = \theta_{actual} - \theta_{desired}$;

computation, at the time point $t_k$, of state feedback gains $K_{11}$, $K_{12}$, $K_{21}$, and $K_{22}$ for axis 1;

computation, at the time point $t_k$, of the thrust difference $T_{diff_1}$ about axis 1 which will restore the axis 1 roll value to its operator-commanded value, the magnitude of said thrust difference being calculated as the difference $$\{[k_{11}] * [\theta_e]_{k-1} + [k_{12}] * [X_4]_{k-1}\} * \frac{L_{T1}}{J} -$$
$$\{[k_{21}] * [\theta_e]_{k-1} + [k_{22}] * [X_4]_{k-1}\} * \frac{L_{T2}}{J}$$

where J is the rotational moment of the craft about the axis, and $L_{T1}$ and $L_{T2}$ represent either the actual lateral distance of the thrusters from the axis, or the equivalent lateral distances of two equivalent single thrusters located on opposite sides of the axis;

update of the axis 1 state variables for use in the state calculations at the next time point, specifically $[X_3]_{k-1}=[X_3]_k$, $[X_4]_{k-1}=[X_4]_k$, $[\dot{X}_4]_{k-1}=[\dot{X}_4]_k$;

application of the computed thrust differences to the control of the thrusters to maintain the desired roll value.

determination, at the time point $t_k$, of the value of the state variable $\dot{X}_6$ representing roll angle acceleration of the craft about axis 2 passing through the mass centroid of the craft, the roll angle acceleration being measured by sensors located on the craft;

determination, at the time point $t_k$, of the value of the state variable $X_6$ representing roll velocity of the craft about axis 2, the roll velocity being measured, or computed as the roll velocity at the previous time point $t_{k-1}$, plus the roll acceleration at the previous time point multiplied by the time interval $\Delta t$;

determination, at the time point $t_k$, of the value of the state variable $X_5 = \theta_{actual}$ representing roll angle of the craft about axis 2, the roll angle being measured, or computed as the roll angle at the previous time point $t_{k-1}$, plus the roll velocity at the previous time point multiplied by the time interval $\Delta t$;

determination, at the time point $t_k$, of the value of the roll angle error $\theta_e$ of the craft about axis 2, the error being computed as the difference between the actual roll angle $\theta_{actual}$ and the operator-commanded roll angle $\theta_{desired}$ as $\theta_e = \theta_{actual} - \theta_{desired}$;

computation, at the time point $t_k$, of state feedback gains $K_{11}$, $K_{12}$, $K_{21}$, and $K_{22}$ for axis 2;

computation, at the time point $t_k$, of the thrust difference $T_{diff_2}$ about axis 2 which will restore the axis 2 roll value to its operator-conunanded value, the magnitude of said thrust difference being calculated as the difference $$\{[k_{11}] * [\theta_e]_{k-1} + [k_{12}] * [X_6]_{k-1}\} * \frac{L_{T1}}{J} -$$
$$\{[k_{21}] * [\theta_e]_{k-1} + [k_{22}] * [X_6]_{k-1}\} * \frac{L_{T2}}{J}$$

where J is the rotational moment of the craft about the axis, and $L_{T1}$ and $L_{T2}$ represent either the actual lateral distance of the thrusters from the axis, or the equivalent lateral distances of two equivalent single thrusters located on opposite sides of the axis;

update of the axis 2 state variables for use in the state calculations at the next time point, specifically $[X_5]_{k-1}=[X_5]_k$, $[X_6]_{k-1}=[X_6]_k$, $[\dot{X}_6]_{k-1}=[\dot{X}_6]_k$;

application of the computed thrust differences to the control of the thrusters to maintain the desired roll value;

constructing a linear equation relating the thrust difference $T_{diff_1}$ about axis 1 required for driving the roll angle about axis 1 to the operator-commanded roll angle, said equation being $s_{11}T_1+s_{12}T_2+s_{13}T_3+ \ldots s_{1n}T_n=T_{diff_1}$, and each of the n factors $s_{1j}$ in the equation representing either a positive or negative constant, whose sign (+ or −) depends on which side of axis 1 the thruster is positioned on, and whose magnitude is a scaling factor related to the lateral distance of the thruster from the roll axis;

constructing a linear equation relating the thrust difference $T_{diff_2}$ about axis 2 required for driving the roll angle about axis 2 to the operator-commanded roll angle, said equation being $s_{21}T_2+s_{22}T_2+s_{23}T_3+ \ldots s_{2n}T_n=T_{diff_2}$, and each factor of the n factors $s_{2j}$ in the equation representing either a positive or negative constant, whose sign (+ or −) depends on which side of axis 2 the thruster is positioned on, and whose magnitude is a scaling factor related to the lateral distance of the thruster from the roll axis;

constructing a linear equation relating the thrust sum $T_{sum}$ to the sum of the n thrusts required for driving the altitude of the craft to the operator-commanded altitude, said equation being $T_1+T_2+T_3+ \ldots T_n=T_{sum}$;

constructing additional linear equations, as necessary, that set the value of thrust $T_i$ for one or more thrusters i at a fixed value $c_i$, that value being given, for example, by $$T_4 = \frac{T_{sum}}{4},$$

or some other value that provides a physically-sensible thrust $T_i$ and which provides a full set of n equations corresponding to the n unknown thrusts;

solving the resulting n linear equations given above to obtain the n individual thrusts that simultaneously drive the axis 1 roll value, the axis 2 roll value, and the altitude to their operator-commanded values, the set of simultaneous equations to be solved being given by:

$$\begin{bmatrix} 1 & 1 & -1 & -1 \\ 1 & -1 & 1 & -1 \\ 1 & 1 & 1 & 1 \\ 1 & 0 & 0 & 0 \end{bmatrix} \begin{bmatrix} T_1 \\ T_2 \\ T_3 \\ T_4 \end{bmatrix} = \begin{bmatrix} T_{diff_1} \\ T_{diff_1} \\ T_{sum} \\ T_{sum}/4 \end{bmatrix}.$$

applying the computed thrust differences and total thrusts to the control of the thrusters to maintain the desired altitude and roll value.

\* \* \* \* \*